US010509269B2

(12) United States Patent
Xiao et al.

(10) Patent No.: US 10,509,269 B2
(45) Date of Patent: Dec. 17, 2019

(54) ARRAY SUBSTRATE, LIQUID CRYSTAL DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenjun Xiao, Beijing (CN); Shijun Wang, Beijing (CN); Xi Chen, Beijing (CN); Xue Dong, Beijing (CN); Zhifu Li, Beijing (CN); Wenbo Jiang, Beijing (CN); Yanna Xue, Beijing (CN); Yue Li, Beijing (CN); Zhiying Bao, Beijing (CN); Zhenhua Lv, Beijing (CN); Yong Zhang, Beijing (CN); Lei Mi, Beijing (CN); Yue Geng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/525,930

(22) PCT Filed: Oct. 31, 2016

(86) PCT No.: PCT/CN2016/103933
§ 371 (c)(1),
(2) Date: May 10, 2017

(87) PCT Pub. No.: WO2017/124810
PCT Pub. Date: Jul. 27, 2017

(65) Prior Publication Data
US 2018/0081245 A1   Mar. 22, 2018

(30) Foreign Application Priority Data
Jan. 19, 2016   (CN) .......................... 2016 1 0034753

(51) Int. Cl.
*G02F 1/1333* (2006.01)
*G02F 1/1343* (2006.01)
(Continued)

(52) U.S. Cl.
CPC .... *G02F 1/134309* (2013.01); *G02F 1/13439* (2013.01); *G02F 1/133512* (2013.01);
(Continued)

(58) Field of Classification Search
None
See application file for complete search history.

(56) References Cited

U.S. PATENT DOCUMENTS

2005/0190316 A1   9/2005   Takahashi et al.
2008/0002123 A1   1/2008   Kim
(Continued)

FOREIGN PATENT DOCUMENTS

CN        1661449 A       8/2005
CN      101097372 A       1/2008
(Continued)

OTHER PUBLICATIONS

International Search Report and Written Opinion in PCT/CN2016/103933 dated Jan. 6, 2017, with English translation.
(Continued)

*Primary Examiner* — Richard H Kim
(74) *Attorney, Agent, or Firm* — Womble Bond Dickinson (US) LLP (57) ABSTRACT

Embodiments of the present disclosure disclose an array substrate, a liquid crystal display panel and a display device. A strip shaped transparent and electrically conductive shielding electrode is arranged above a gate line, and an outer contour of a projection of the shielding electrode on a base substrate surrounds a projection of the gate line on the base substrate, and the shielding electrode is insulated from
(Continued)

both a pixel electrode and the gate line. The shielding electrode can shield the electrical field above the gate line.

12 Claims, 7 Drawing Sheets

(51) Int. Cl.
    *G02F 1/1335*     (2006.01)
    *G02F 1/1362*     (2006.01)
(52) U.S. Cl.
    CPC .. *G02F 1/136209* (2013.01); *G02F 1/136286* (2013.01); *G02F 2001/134372* (2013.01); *G02F 2001/136218* (2013.01); *G02F 2201/40* (2013.01)

(56) References Cited

U.S. PATENT DOCUMENTS

| | | | |
|---|---|---|---|
| 2009/0225250 | A1 | 9/2009 | Lyu et al. |
| 2010/0230680 | A1* | 9/2010 | Seong ............... G02F 1/134363 257/59 |
| 2015/0364500 | A1 | 12/2015 | Cheng et al. |
| 2017/0059907 | A1* | 3/2017 | Chong .................. G02F 1/1368 |
| 2017/0199441 | A1* | 7/2017 | Um .................... G02F 1/134309 |
| 2018/0136526 | A1* | 5/2018 | Sung ................... H01L 23/5225 |

FOREIGN PATENT DOCUMENTS

| | | |
|---|---|---|
| CN | 201054061 Y | 4/2008 |
| CN | 203883006 U | 10/2014 |
| CN | 104597643 A | 5/2015 |
| CN | 104656324 A | 5/2015 |
| CN | 105446029 A | 3/2016 |
| CN | 205450519 U | 8/2016 |

OTHER PUBLICATIONS

Office Action received for Chinese Patent Application No. 201610034753.3, dated Mar. 5, 2018, 13 pages (6 pages of English Translation and 7 pages of Office Action).

* cited by examiner

ARRAY SUBSTRATE, LIQUID CRYSTAL DISPLAY PANEL, AND DISPLAY DEVICE

RELEVANT APPLICATION

The present application is the U.S. national phase entry of PCT/CN2016/103933, with an international filing date of Oct. 31, 2016, which claims priority of Chinese invention patent application No. 201610034753.3, filed on Jan. 19, 2016, the entire disclosure of which is incorporated herein by reference.

TECHNICAL FIELD

The present disclosure relates to the field of display technology, particularly to an array substrate, a liquid crystal display panel and a display device.

BACKGROUND DISCLOSURE

A liquid crystal display device has developed quickly and has become a mainstream panel display device. Up to now, the liquid crystal display device has developed into several types such as Twisted Nematic (TN) type, Advanced Dimension Switch (ADS) type, High-Advanced Dimension Switch (HADS) type and In-Plane Switch (IPS) type. The driving modes and display effects thereof are not the same, and each type has its strong points. The ADS type and the HADS type liquid crystal display devices present excellent display capability and effect with their unique structure characteristics and driving principles.

The main difference between the ADS type and the HADS type liquid crystal display device lies in that, a slit common electrode in the HADS type liquid crystal display device is located above a plate pixel electrode, while in the ADS type liquid crystal display device, a slit pixel electrode is located above a plate common electrode. Compared to the HADS type liquid crystal display device, in the existing ADS type liquid crystal display device, because the common electrode does not cover a data line and a gate line, loads of the data line and the gate line are relatively small, which is more suitable for design of large dimension.

Figure 1A:
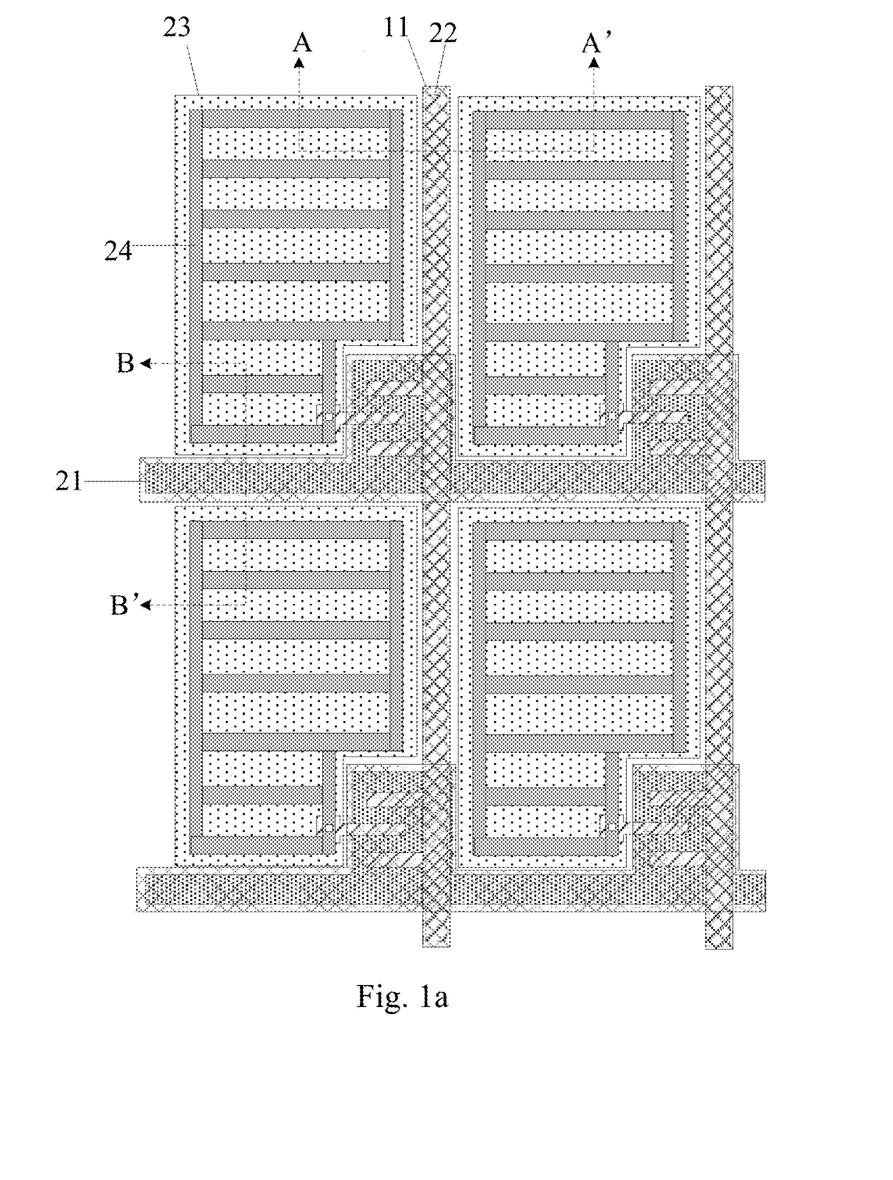
FIG. 1a is a structural schematic top view of an existing ADS liquid crystal display device.
Figure 1B:
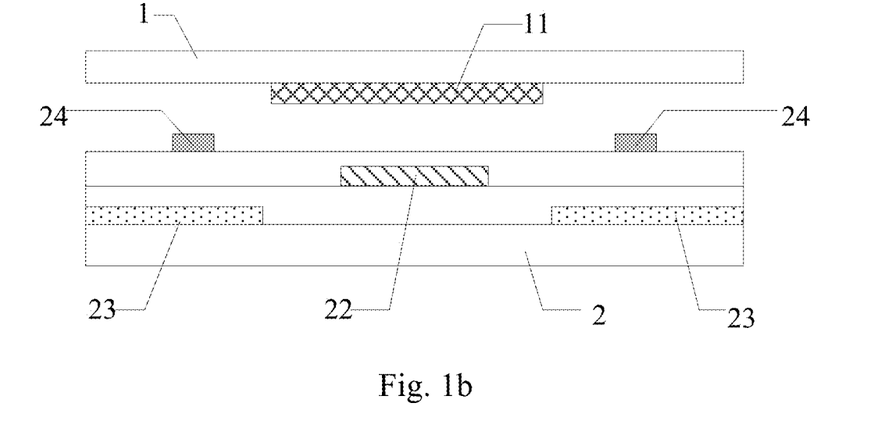
FIG. 1b is a structural schematic sectional view of the liquid crystal display device as shown in FIG. 1a along A-A' direction.
Figure 1C:
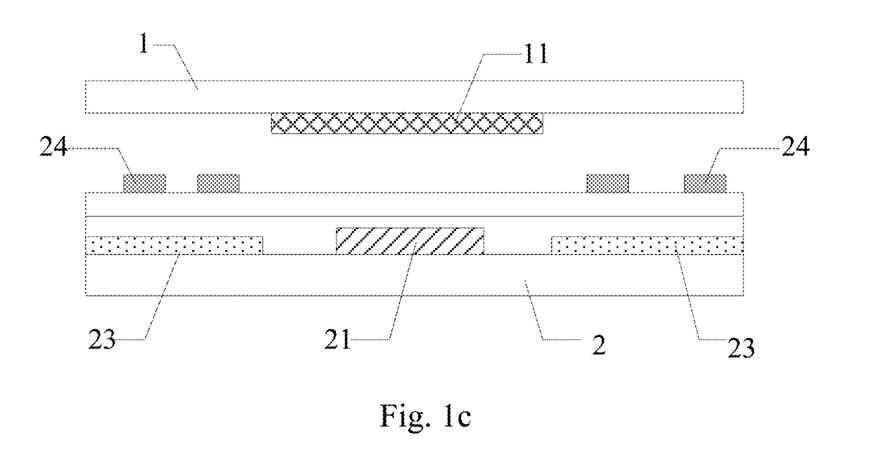
FIG. 1c is a structural schematic sectional view of the liquid crystal display device as shown in FIG. 1a along B-B' direction.

The structure of the existing ADS type liquid crystal display device for example is as shown in FIG. 1a to FIG. 1c. It comprises an upper substrate 1 and a lower substrate 2 arranged opposite to each other, a gate line 21, a data line 22, a common electrode 23 and a pixel electrode 24 located on the upper substrate 2. A color filtering layer (not shown in the figures) and a black matrix 11 are arranged on the upper substrate 1. The black matrix 11 is directly opposite to the data line 22 and the gate line 21. However, the above ADS type liquid crystal display device has some shortcomings. For example, the upper substrate may be shifted by pressing the display panel vigorously. If the black matrix 11 located above the gate line 21 is relatively narrow, light leakage may occur easily. Hence, in order to prevent light leakage, the black matrix 11 is required to have a relatively large width generally, however, if so, aperture ratio and light transmissivity will be reduced.

SUMMARY

Therefore, it is desired to provide an array substrate, a liquid crystal display panel and a display device that can prevent light leakage and improve aperture ratio and light transmissivity.

An embodiment of the present disclosure provides an array substrate, comprising: a base substrate; a gate line located on the base substrate; and a common electrode and a pixel electrode arranged on the base substrate in sequence and insulated from each other. A layer where the pixel electrode locates is located above a layer where the gate line locates. The array substrate further comprises a strip shaped shielding electrode located above the gate line, the shielding electrode being transparent and electrically conductive. An outer contour of a projection of the shielding electrode on the base substrate surrounds a projection of the gate line on the base substrate, and the shielding electrode is insulated from both the pixel electrode and the gate line.

According to another embodiment of the present disclosure, the shielding electrode is in a same layer and of a same material as the pixel electrode and is independent of the pixel electrode.

According to another embodiment of the present disclosure, a layer where the common electrode locates is located above the layer where the gate line locates, and the shielding electrode is in a same layer and of a same material as the common electrode.

According to another embodiment of the present disclosure, a material of the shielding electrode is a transparent electrically conductive oxide.

According to another embodiment of the present disclosure, the shielding electrode has at least one slit in an area where the shielding electrode overlaps with the gate line.

According to another embodiment of the present disclosure, the shielding electrode has one slit, and an orthographic projection of the slit on the base substrate overlaps with an orthographic projection of the gate line on the base substrate.

According to another embodiment of the present disclosure, a width of the at least one slit is smaller than or equal to a width of the gate line.

According to another embodiment of the present disclosure, the common electrode is a plate electrode, and the pixel electrode is a slit electrode.

An embodiment of the present disclosure further provides a liquid crystal display panel, comprising an array substrate and a counter substrate arranged opposite to each other, and a liquid crystal layer located between the array substrate and the counter substrate. The array substrate is the array substrate provided by embodiments of the present disclosure.

According to another embodiment of the present disclosure, the liquid crystal display panel further comprises a black matrix located between the array substrate and the counter substrate. An orthographic projection of the black matrix on the base substrate does not overlap with an orthographic projection of the gate line on the base substrate.

An embodiment of the present disclosure further provides a display device, comprising the liquid crystal display panel provided by embodiments of the present disclosure.

DETAILED DESCRIPTION OF THE DISCLOSURE

In order to enable objects, technical solutions and advantages of the present disclosure to be clearer, next, specific embodiments of an array substrate, a liquid crystal display panel and a display device provided by embodiments of the present disclosure will be explained in detail with reference to the drawings.

In the drawings, thicknesses and the shapes of films do not reflect a real proportion of the array substrate, which only aims to schematically explaining the present disclosure.

It should be understood that when it is stated that an element or a layer is "on", "on top of", "above", "connected to" or "coupled to" another element or layer, it can be directly on, connected to or coupled to another element or layer, or an inserted element or layer may also exist. On the contrary, when it is stated that an element is "directly on", "directly connected to" or "directly coupled to" another element or layer, no inserted element or layer exists.

Figure 2A:
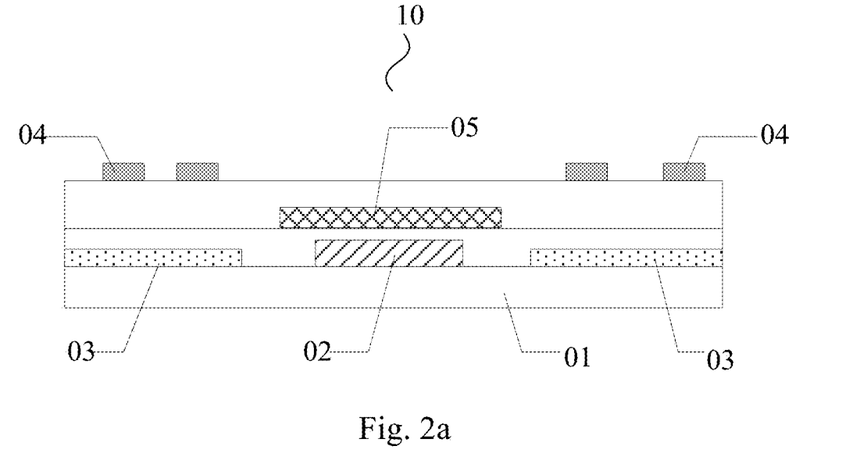
FIG. 2a is a structural schematic view of an array substrate provided by an embodiment of the present disclosure.
Figure 2B:
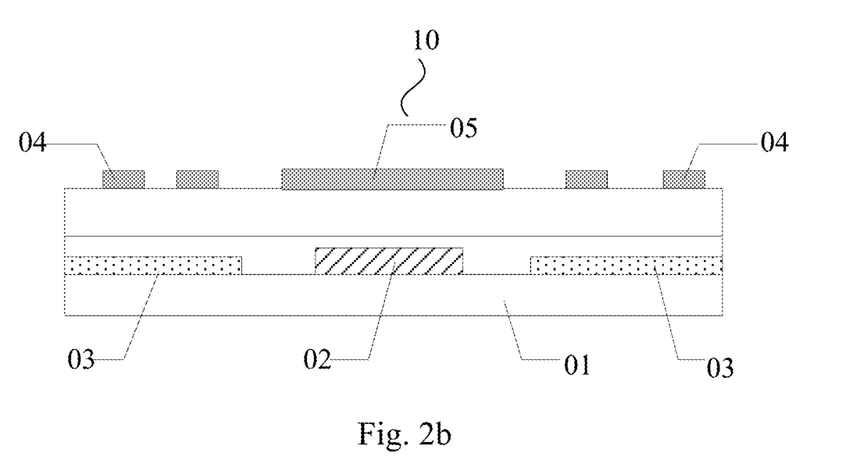
FIG. 2b is another structural schematic view of an array substrate provided by an embodiment of the present disclosure.
Figure 2C:
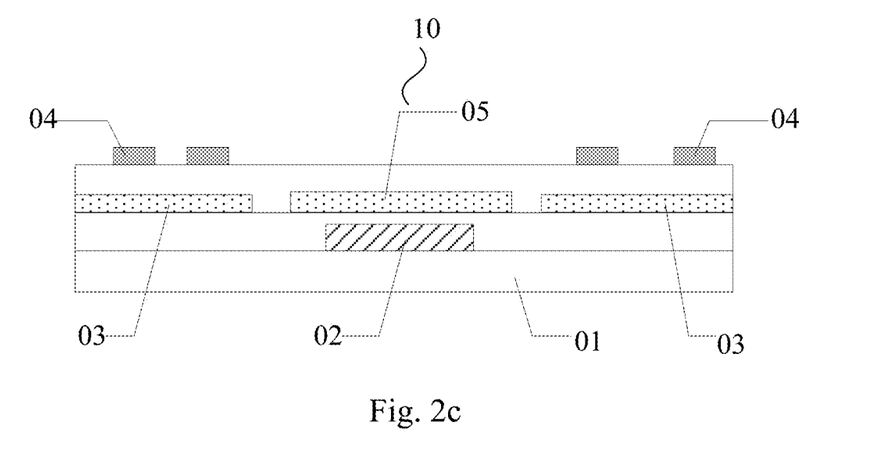
FIG. 2c is another structural schematic view of an array substrate provided by an embodiment of the present disclosure.

An embodiment of the present disclosure provides an array substrate 10. As shown in FIG. 2a to FIG. 2c, the array substrate 10 can comprise a base substrate 01, a gate line 02 located on the base substrate 01, and a common electrode 03 and a pixel electrode 04 arranged on the base substrate 01 in sequence and insulated from each other. A layer where the pixel electrode 04 locates is located above a layer where the gate line 02 locates. The array substrate 10 can further comprise a strip shaped shielding electrode 05 located above the gate line 02. The shielding electrode 05 is transparent and electrically conductive. An outer contour of a projection of the shielding electrode 05 on the base substrate 01 surrounds a projection of the gate line 02 on the base substrate 01, and the shielding electrode 05 is insulated from both the pixel electrode 04 and the gate line 02.

In the array substrate provided by the embodiment of the present disclosure, a strip shaped transparent and electrically conductive shielding electrode is arranged above the gate line, and an outer contour of a projection of the shielding electrode on the base substrate surrounds a projection of the gate line on the base substrate, and the shielding electrode is insulated from both the pixel electrode and the gate line. The shielding electrode can shield the electrical field above the gate line. Hence, even if the liquid crystal display panel formed by the array substrate is shifted due to effect of an external force, deflection of the liquid crystals will not be influenced, which can prevent light leakage. In addition, since the shielding electrode can prevent light leakage, in the liquid crystal display panel comprising the array substrate, arrangement of a black matrix above the gate line can be omitted, thereby increasing aperture ratio and light transmissivity of the display panel.

In a liquid crystal display panel formed by the array substrate provided by an embodiment of the present disclosure, when performing display, the shielding electrode for example can be applied with a common electrode signal. Hence, two terminals of the shielding electrode can be electrically connected with the common electrode located within a frame area of the array substrate.

According to another embodiment of the present disclosure, a material of the shielding electrode is a transparent electrically conductive oxide. For example, the material of the shielding electrode can be indium tin oxide (ITO) or indium zinc oxide (IZO) etc., which will not be defined here.

According to another embodiment of the present disclosure, as shown in FIG. 2b, the shielding electrode 05 can be in a same layer and of a same material as the pixel electrode 04 and is independent of the pixel electrode 04. Thus, when manufacturing the array substrate, a process of manufacturing the shielding electrode does not have to be added separately, only needing to change a pattern of original pixel electrode when manufacturing the pixel electrode. Hence, the manufacturing cost can be reduced.

According to another embodiment of the present disclosure, as shown in FIG. 2c, a layer where the common electrode 03 locates is located above the layer where the gate line 02 locates. Certainly, the layer where the common electrode 03 locates can also be located under the layer where the gate line 02 locates. Alternatively, as shown in FIG. 2b, the common electrode 03 can also be located in a same layer as the gate line 02, which will not be defined here.

According to another embodiment of the present disclosure, as shown in FIG. 2c, when the layer where the common electrode 03 locates is located above the layer where the gate line 02 locates, the shielding layer 05 is in the same layer and of the same material as the common electrode 03. Thus, when manufacturing the array substrate, a process of manufacturing the shielding electrode does not have to be added separately, only needing to change a pattern of original common electrode when manufacturing the common electrode. Hence, the manufacturing cost can be reduced.

Figure 3A:
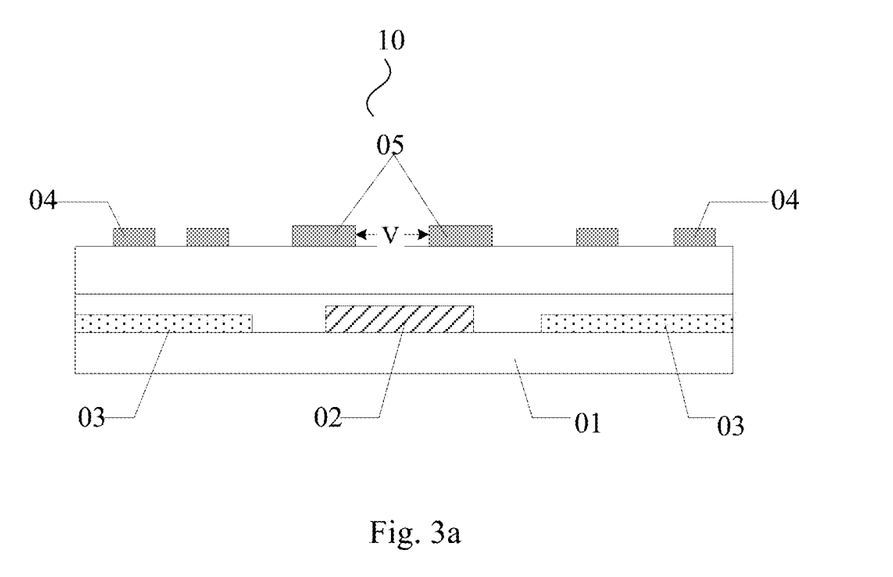
FIG. 3a is another structural schematic view of an array substrate provided by an embodiment of the present disclosure.
Figure 3B:
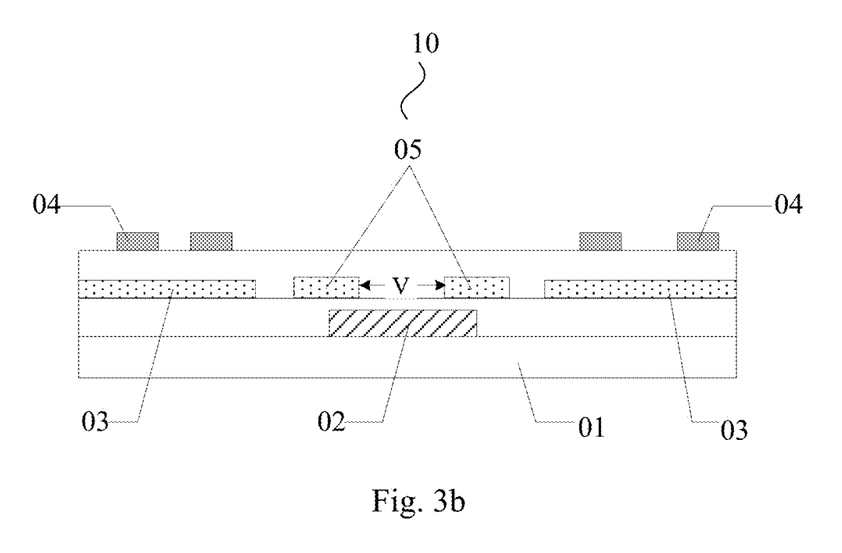
FIG. 3b is another structural schematic view of an array substrate provided by an embodiment of the present disclosure.

In the above array substrate provided by the embodiments of the present disclosure, because the shielding electrode located above the gate line may generate parasitic capacitance with the gate line so as to result in increase of a load on the gate line, according to another embodiment of the present disclosure, in order to reduce the load on the gate line, as shown in FIG. 3a and FIG. 3b, the shielding electrode 05 has at least one slit V in an area where the shielding electrode 05 overlaps with the gate line 02. Thus, the load on the gate line 02 can be reduced by reducing the overlapping area of the shielding electrode 05 and the gate line 02.

In specific implementation, in order to have a better anti-leakage effect, a width of the slit can be smaller than or equal to a width of the gate line.

According to another embodiment of the present disclosure, the shielding electrode has one slit, and an orthographic projection of the slit on the base substrate overlaps with an orthographic projection of the gate line on the base substrate.

In specific implementation, the common electrode can be a plate electrode, and the pixel electrode can be a slit electrode. That is, the array substrate can comprise an ADS type pixel structure.

Further, the array substrate can further comprise a data line. A layer where the data line locates can be arranged between the layer where the gate line locates and the layer where the pixel electrode locates. Insulating layers are arranged among the data line, the pixel electrode, the common electrode and the gate line.

Based on the same inventive concept, an embodiment of the present disclosure further provides a liquid crystal display panel, comprising an array substrate and a counter substrate arranged opposite to each other, and a liquid crystal layer located between the array substrate and the counter substrate. The array substrate can be the array substrate provided by embodiments of the present disclosure.

Figure 4A:
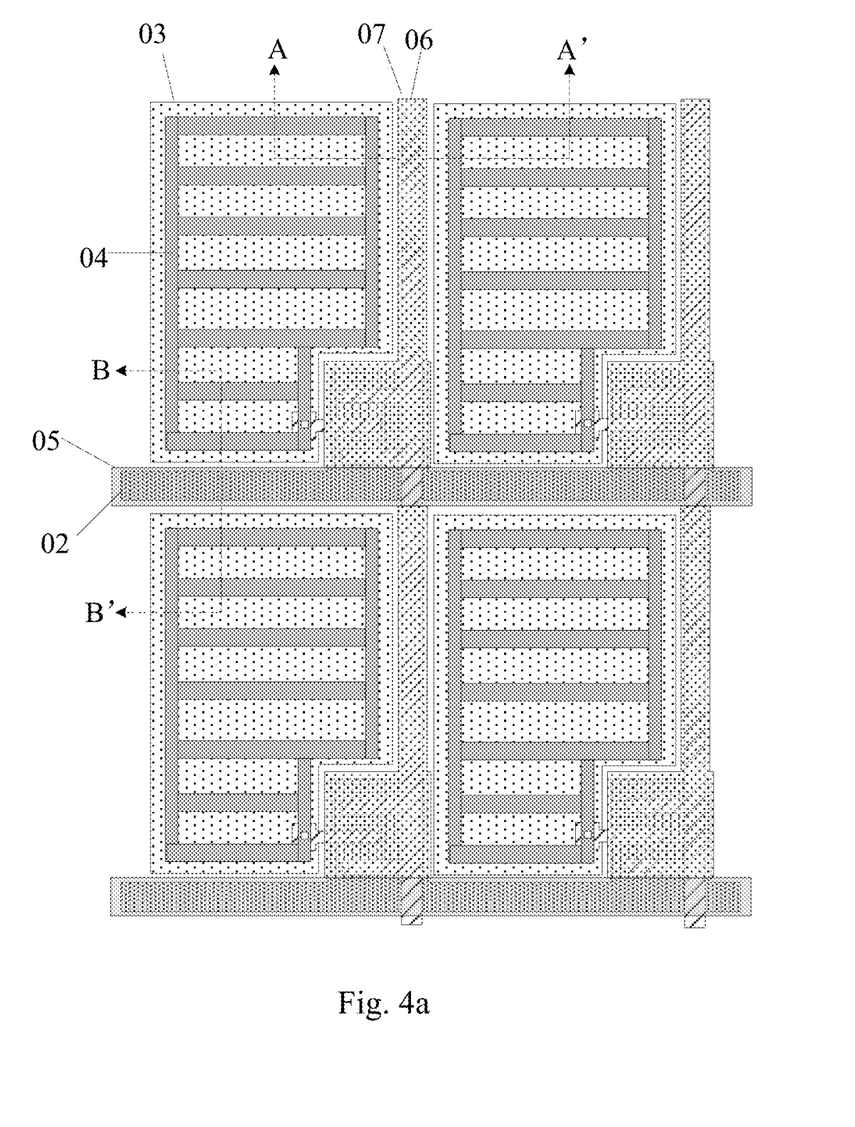
FIG. 4a is a structural schematic top view of a liquid crystal display panel provided by an embodiment of the present disclosure.
Figure 4B:
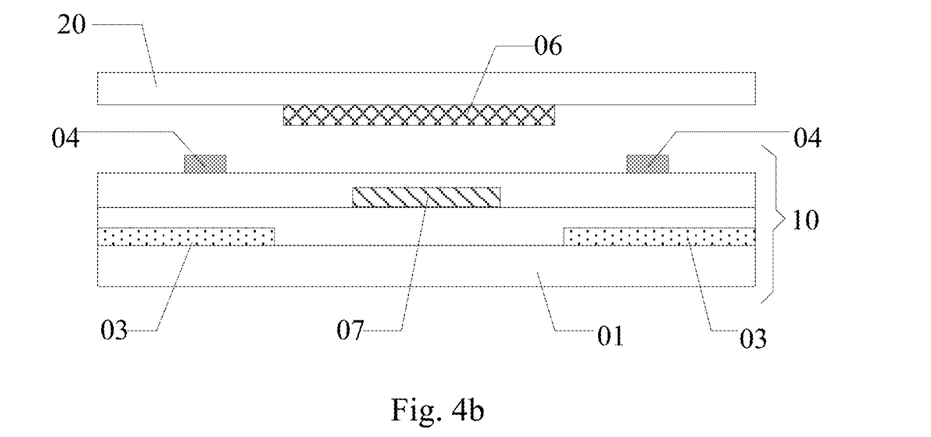
FIG. 4b is a structural schematic sectional view of the liquid crystal display panel as shown in FIG. 4a along A-A' direction.
Figure 4C:
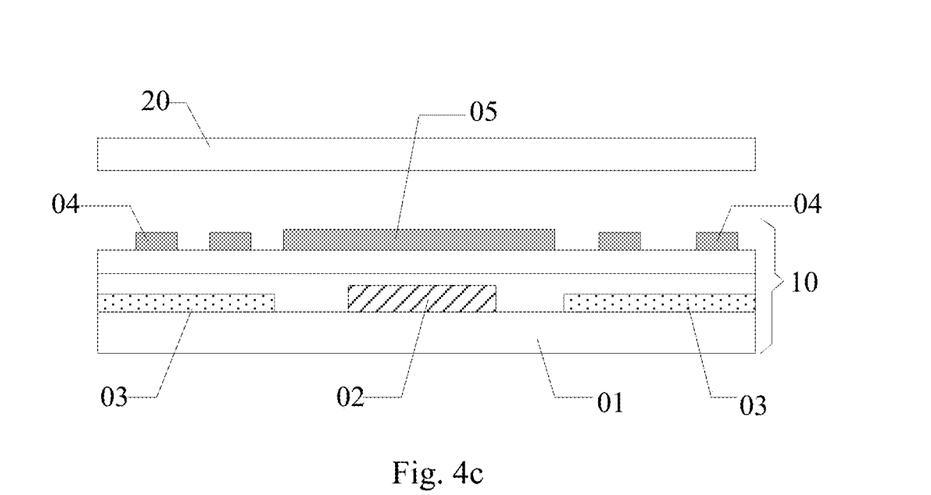
FIG. 4c is a structural schematic sectional view of the liquid crystal display panel as shown in FIG. 4a along B-B' direction.

According to another embodiment of the present disclosure, as shown in FIG. 4a to FIG. 4c, the liquid crystal display panel can further comprise a black matrix 06 located between the array substrate 10 and the counter substrate 20. An orthographic projection of the black matrix 06 on the base substrate 01 does not overlap with an orthographic projection of the gate line 02 on the base substrate 01.

Further, as shown in FIG. 4a and FIG. 4b, the liquid crystal display panel can further comprise a data line 07 located on the base substrate 01 of the array substrate 10. Certainly, other films and structures that have been known by the skilled person in the art can also be arranged in the liquid crystal display panel, which will not be repeated here.

In the liquid crystal display panel provided by embodiments of the present disclosure, a strip shaped transparent and electrically conductive shielding electrode is arranged above the gate line, and an outer contour of a projection of the shielding electrode on the base substrate of the array substrate surrounds a projection of the gate line on the base substrate, and the shielding electrode is insulated from both the pixel electrode and the gate line. The shielding electrode can shield the electrical field above the gate line. Hence, even if the liquid crystal display panel is shifted due to effect of an external force, deflection of the liquid crystals will not be influenced, which can prevent light leakage. In addition, since the shielding electrode can prevent light leakage, in the liquid crystal display panel, arrangement of a black matrix above the gate line can be omitted, thereby increasing aperture ratio and light transmissivity of the display panel.

Based on the same inventive concept, an embodiment of the present disclosure further provides a display device, comprising the above liquid crystal display panel provided by embodiments of the present disclosure. The display device can be any product or component with display function such as a mobile phone, a tablet computer, a television, a laptop, a digital photo frame, a navigator etc. The implementation of the display device can refer to the embodiments of the liquid crystal display panel, which will not be repeated.

In the array substrate, the liquid crystal display panel and the display device provided by embodiments of the present disclosure, a strip shaped transparent and electrically conductive shielding electrode is arranged above the gate line, and an outer contour of a projection of the shielding electrode on the base substrate surrounds a projection of the gate line on the base substrate, and the shielding electrode is insulated from both the pixel electrode and the gate line. The shielding electrode can shield the electrical field above the gate line. Hence, even if the liquid crystal display panel formed by the array substrate is shifted due to effect of an external force, deflection of the liquid crystals will not be influenced, which can prevent light leakage. In addition, since the shielding electrode can prevent light leakage, in the liquid crystal display panel formed by the array substrate, arrangement of a black matrix above the gate line can be omitted, thereby increasing aperture ratio and light transmissivity of the display panel.

Apparently, the skilled person in the art can make various modifications and variations to embodiments of the present disclosure without departing from the spirit and the scope of the present disclosure. In this way, provided that these modifications and variations to embodiments of the present disclosure fall within scopes of claims of the present disclosure and the equivalent technologies thereof, the present disclosure also intends to encompass these modifications and variations.

The invention claimed is:

1. A liquid crystal display panel, comprising:
an array substrate, comprising:
a base substrate;
a gate line located on the base substrate; and
a common electrode and a pixel electrode arranged on the base substrate in sequence and insulated from each other, a layer where the pixel electrode locates being located above a layer where the gate line locates,
wherein the array substrate further comprises a strip shaped shielding electrode located above the gate line, the shielding electrode being transparent and electrically conductive, and
wherein an outer contour of a projection of the shielding electrode as a whole on the base substrate surrounds a projection of the gate line as a whole on the base substrate, and the shielding electrode is insulated from both the pixel electrode and the gate line;
a counter substrate arranged opposite to the array substrate;
a liquid crystal layer located between the array substrate and the counter substrate; and
a black matrix disposed on a side of the counter substrate facing the array substrate,
wherein an orthographic projection of the black matrix as a whole on the base substrate does not overlap with an orthographic projection of the gate line as a whole on the base substrate.

2. The liquid crystal display panel as claimed in claim 1, wherein the shielding electrode is in a same layer and of a same material as the pixel electrode and is independent of the pixel electrode.

3. The liquid crystal display panel as claimed in claim 1, wherein a layer where the common electrode locates is located above the layer where the gate line locates, and the shielding electrode is in a same layer and of a same material as the common electrode.

4. The liquid crystal display panel as claimed in claim 1, wherein a material of the shielding electrode is a transparent electrically conductive oxide.

5. The liquid crystal display panel as claimed in claim 1, wherein the common electrode is a plate electrode, and the pixel electrode is a slit electrode.

6. A display device, comprising the liquid crystal display panel as claimed in claim 1.

7. A liquid crystal display panel, comprising:
an array substrate, comprising:
a base substrate;
a gate line located on the base substrate; and a common electrode and a pixel electrode arranged on the base substrate in sequence and insulated from each other, a layer where the pixel electrode locates being located above a layer where the gate line locates, wherein the array substrate further comprises a strip shaped shielding electrode located above the gate line, the shielding electrode being transparent and electrically conductive, and wherein an outer contour of a projection of the shielding electrode as a whole on the base substrate surrounds a projection of the gate line as a whole on the base substrate, and the shielding electrode is insulated from both the pixel electrode and the gate line;

a counter substrate arranged opposite to the array substrate;

a liquid crystal layer located between the array substrate and the counter substrate; and a black matrix disposed on a side of the counter substrate facing the array substrate, wherein an orthographic projection of the black matrix as a whole on the base substrate does not overlap with an orthographic projection of the gate line as a whole on the base substrate, and wherein the shielding electrode has at least one slit in an area where the shielding electrode overlaps with the gate line.

8. The liquid crystal display panel as claimed in claim 7, wherein the shielding electrode has one slit, and an orthographic projection of the slit on the base substrate overlaps with an orthographic projection of the gate line on the base substrate.

9. The liquid crystal display panel as claimed in claim 7, wherein a width of the at least one slit is smaller than or equal to a width of the gate line.

10. The liquid crystal display panel as claimed in claim 7, wherein the shielding electrode is in a same layer and of a same material as the pixel electrode and is independent of the pixel electrode.

11. The liquid crystal display panel as claimed in claim 7, wherein a layer where the common electrode locates is located above the layer where the gate line locates, and the shielding electrode is in a same layer and of a same material as the common electrode.

12. The liquid crystal display panel as claimed in claim 7, wherein a material of the shielding electrode is a transparent electrically conductive oxide.

\* \* \* \* \*